Oct. 7, 1969 3,470,831
HEINRICH-JURGEN F. VON DRACHENFELS
COATING PROCESS AND APPARATUS
Filed Aug. 29, 1967 2 Sheets-Sheet 2

United States Patent Office 3,470,831
Patented Oct. 7, 1969

3,470,831
COATING PROCESS AND APPARATUS
Heinrich-Jurgen Freiherr von Drachenfels, Langenhagen, Germany, assignor to Werner Bahlsen, Hannover, Germany
Filed Aug. 29, 1967, Ser. No. 664,007
Claims priority, application Germany, Sept. 9, 1966, B 88,849
Int. Cl. A23g *3/20, 3/02, 7/00*
U.S. Cl. 107—54                 7 Claims

ABSTRACT OF THE DISCLOSURE

Centres are coated with chocolate by spraying with undercooled molten chocolate in such manner that the ratio of flow velocity of the chocolate fed to the spray nozzle to the diameter of the feed pipe is at least 2.5 m./min./mm. In apparatus for carrying out this process the pipe leading to the spray nozzle is of constant flow cross-section and this cross-section is not reduced, or not substantially reduced in the nozzle.

---

Figure 1:
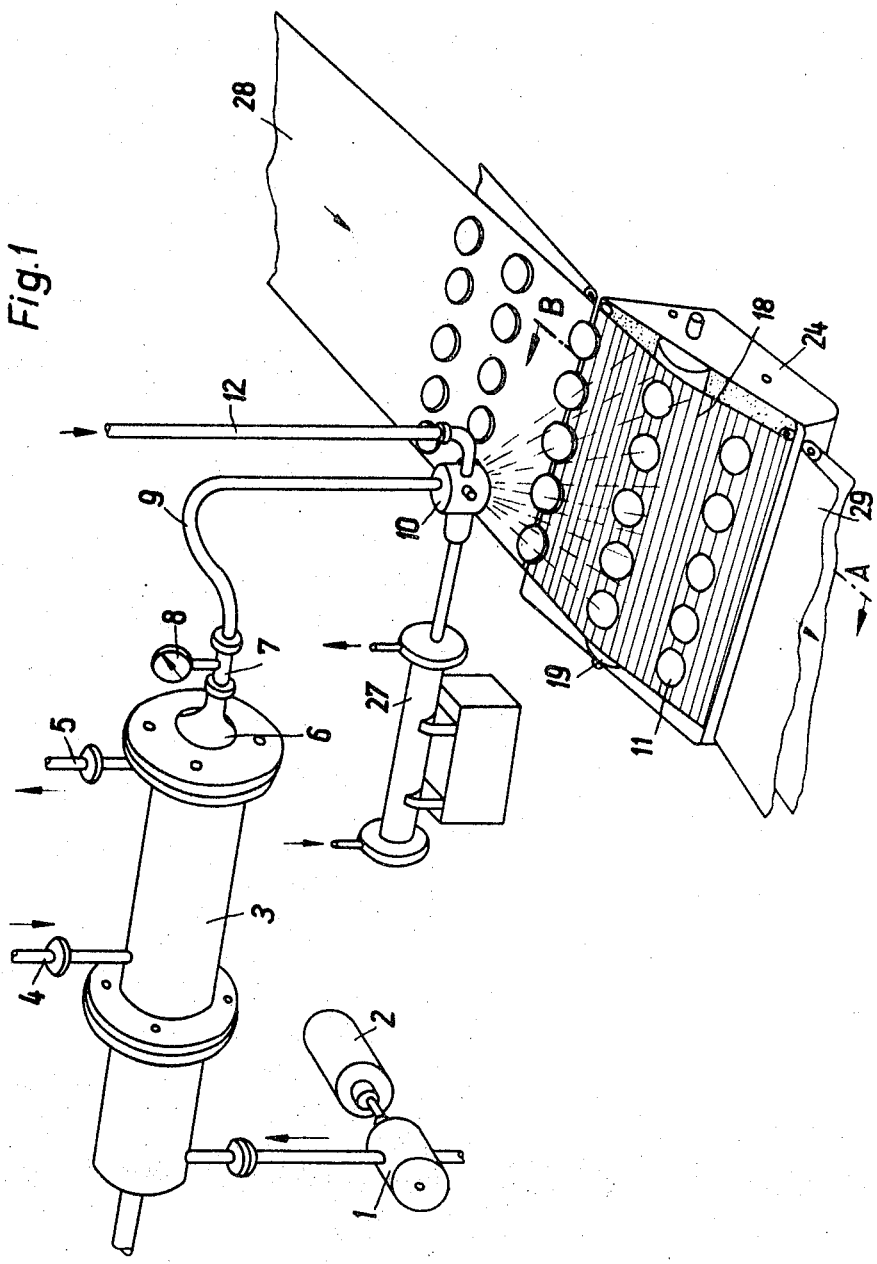

This invention relates to a process for coating centres with chocolate, in which a fluid mass of chocolate, preheated in a hopper, is undercooled in a pressure cooler with a vigorous mechanical motion, retaining its fluidity, and in this condition is applied direct on the centres to be coated, and an apparatus for carrying out this method.

In processing softened chocolate masses above the solidification point in the conventional manner in coating machines, usually a film of chocolate is produced from a slotted nozzle through which film pass the centres to be coated, lying on a grid type conveyer belt. The excess mass, flowing away in the film, is trapped in a sump below the grid belt and fed back again to a hopper feeding the nozzle. All the members taking part in the feed of the mass are carefully maintained at constant temperature, at or above the chocolate processing temperature. They have the largest possible cross-section in order to keep the effect of exterior temperature as small as possible. These operating arrangements cannot be applied in the case of undercooled masses, as these would solidify in the various containers. It has also been found that the flow cross-section becomes very rapidly stopped up with solidified material, as it must not be heated.

An object of the invention is to provide a method of processing chocolate material, undercooled in the manner mentioned above, but in which the abovementioned disadvantages do not occur.

This is attained in accordance with the invention by the chocolate mass being applied on the centres by spraying, and a flow velocity being imparted to the chocolate mass until the actual spraying takes place, which is such that the ratio of this velocity to the pipe diameter is at least 2.5 m./min./mm.

It has been found that with this procedure any premature solidification of the chocolate mass is excluded—apparently because of the considerable shear stresses acting in the flowing mass and the relative velocities between adjacent particles.

Until now the spraying of chocolate masses has only been known in dragee work, where the mass is fed to heatable spray nozzles from hoppers and pipes of large cross-section, carefully maintained at high temperature, and which are basically unsuitable for the reasons given above for processing undercooled masses.

It is further known to lead chocolate masses softened above solidification point through narrow pipings in order to remove deleterious air bubbles with high velocity; but here again the mass arrives in a stationary hopper for further processing in conventional manner. This known process has therefore nothing in common with the invention, either as regards the object to be attained or as regards the means employed.

It has been found in accordance with the invention that secure operation without a very large expenditure of energy is possible if the quotient of the flow velocity divided by the pipe diameter is 3.5 m./min./mm. or over. It is further advantageous if the mass to be sprayed is maintained under high pressure, for instance 15 to 25 atmospheres gauge, in the pipe to the spray nozzle. The spraying itself is preferably effected in known manner by means of a gaseous second medium fed under pressure.

The apparatus for carrying out the process is specially characterized in accordance with the invention in that the pipe to the spray nozzle is of constant cross-section and that this cross-section is not, or not considerably, reduced in the nozzle.

The construction of the nozzle is preferably such that the chocolate mass emerges from a central nozzle aperature and that the gaseous second medium emerges from an annular aperture with a conical angle of about 160° on to the chocolate mass.

Advantageously, the spray nozzle may be movable and if requisite motor-driven, over the centres to be sprayed, that is to say over the conveyer belt carrying these, so that the centres can be sprayed in a multiple manner and from various directions.

Figure 2:
Figure 3:
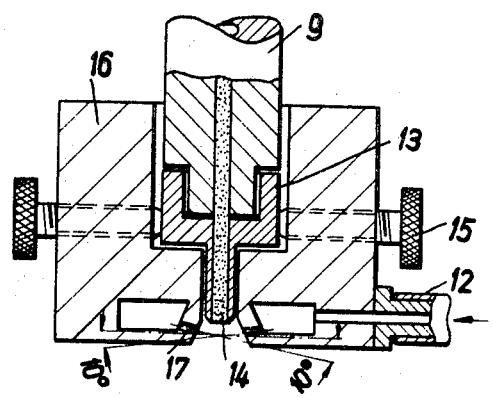
Figure 4:
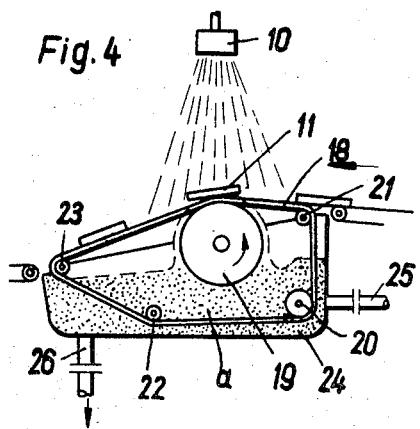

The invention will now be described by way of example with reference to the accompanying drawings in which:

FIGURE 1 shows in perspective the arrangement of the spray nozzle over the material to be sprayed, FIGURE 2 shows a piece of confectionery coated with chocolate, FIGURE 3 represents the spray nozzle in cross-section and on a large scale than in FIGURE 1, the angle of the air outflow duct being shown translated, and FIGURE 4 is a cross-section taken on the line A–B of FIGURE 1.

In the apparatus represented, the hot fluid chocolate mass (at about 50° C.) is fed out of a hopper (not shown) with a pump 1 (FIGURE 1) which is driven by a motor 2, into a pressure cooler 3 at a pressure up to a maximum of 80 atmospheres gauge and is subjected to a vigorous mechanical motion by means of rotating wiper blades (not shown). Coolant is fed into the pressure cooler through pipes 4 and 5.

From the pressure cooler the undercooled chocolate mass emerges through a discharge connecting member 6, the dimensions of whose discharge cross-section are such that there is imparted to the undercooled chocolate mass a high flow velocity to retain the fluidity. Immediately next to the discharge connecting member 6 there is provided a connecting member 7 with a pressure gauge 8 for indicating the pressure. From the connecting member 7 a flexible pipe 9 leads direct to a spray nozzle 10. The free flow cross-section in the connecting member 7 and in the flexible pipe 9 corresponds to the discharge cross-section of the discharge connecting member 6. This flow cross-section remains unaltered up to the point of discharge from the nozzle.

The spray nozzle 10 sprays the chocolate mass, on to confectionery 11 in the example, in such a way that the whole surface of the confectionery 11 (FIGURE 2) is uniformly coated with chocolate. There is used as the spray nozzle 10 (FIGURE 3) a known type of nozzle with air spray, air being fed laterally to the nozzle through a flexible pipe 12 (FIGURES 1 and 3). Of course instead of air another suitable gas may be used.

A guide member 13 of the nozzle, fitted to the flexible pipe 9, is provided with a bore 14, the diameter of which is equal to the bore of the flexible pipe 9. The guide member 13 supports an air feed member 16 by means of holding screws 15. In the lower part of the air feed member 16 there are provided bores 17, from which the air emerges concentrically to the chocolate string. In this case the discharge angle is about 80° to the vertical axis. As the air current reaches the chocolate this is disintegrated into extremely fine particles. A cone of spray is produced covering to the maximum extent all the confectioneries 11 over the whole width of the grid belt 18 (FIGURES 1 and 4).

The wetting of the confectioneries on the underside is preferably effected with the following device:

The grid belt takes the form of an endless belt and is driven via a roller 19, being deflected over rollers 20 to 23. This grid belt dips into a tank 24 filled with liquid chocolate. By rotating the roller 19 the chocolate mass is impelled in the direction of rotation of the roller, so that the part of the grid belt lying above the roller is completely dipped into the chocolate and the confectionery guided thereover is wiped on the underside with chocolate.

The undercooled chocolate flowing through the grid belt beside the confectioneries is absorbed by the chocolate mass located between and below the grid belt and there acts simultaneously as a crystal seeding agent.

The tank 24 is provided with a feedpipe 25 and a discharge pipe 26 for changing the chocolate mass.

The air nozzle 10 can be moved via a hydraulic cylinder 27 transversely to the direction of movement of the confectioneries over the grid belt.

The rows of confectionery are fed on a feed belt 28 to the grid belt 18 and then on further to the belt 29.

The apparatus works with a chocolate mass such as is indicated in more detail in German patent speecification 1,145,468, and successful results have been obtained under the following conditions:

|  | Case I | Case II |
|---|---|---|
| Pipe and nozzle diameter (mm.) | 6 | 4 |
| Chocolate temperature (° C.) | 23.5–24 | 23.5–24 |
| Throughput of mass (kg./h.) | 45 | 45 |
| Flow velocity (calculated) (metres per min.) | 22 | 50 |
| Pressure at beginning of pipe (atm. gauge) | 15–20 | About 25 |
| Length of pipe (metres) | 0.5 | 0.5 |

As the shear stresses occurring in the flowing mass are also dependent on the viscosity of the mass, the values indicated for the ratio of velocity to pipe diameter may be varied in direct dependence on the viscosity, for instance they may deviate under higher temperature.

I claim:

1. In a process for coating centres with chocolate, in which a fluid mass of chocolate preheated in a hopper is undercooled in a pressure cooler with vigorous mechanical movement retaining its fluidity and in this condition is brought direct to the centres to be coated, the steps of (a) applying the chocolate mass on the centres by spraying from a spray nozzle connected to said cooler by a pipe, and (b) imparting to the chocolate mass to be sprayed up to the actual spraying so high a flow velocity that the ratio of the velocity to the pipe diameter is at least 2.5 metres per minute per mm.

2. A process as claimed in claim 1, in which the flow velocity is made so high that the quotient of velocity and pipe diameter is about 3.5 metres per minute per mm. or more.

3. A process as claimed in claim 1, in which the mass to be sprayed is maintained in the pipe to the spray nozzle under increased pressure of for instance 15 to 25 atmospheres gauge.

4. A process as claimed in claim 1, in which the spraying is effected in known manner by means of a gaseous medium fed under pressure to said nozzle.

5. In apparatus for coating centres with chocolate, a cooler for undercooling a chocolate mass while maintaining fluidity thereof, an outlet pipe connected to said cooler and having a substantially constant internal cross-section, a spray nozzle attached to said outlet pipe and having a discharge aperture of a flow cross-section substantially equal to said internal cross-section of the outlet pipe, and means for admitting a gaseous medium under pressure to said nozzle in a manner such that said chocolate mass will be sprayed upon said centres to be coated.

6. In apparatus for coating centres with chocolate, a hopper for receiving a fluid chocolate mass, means for preheating said mass in said hopper, a pressure cooler connected to said hopper for undercooling said mass, means for imparting a vigorous mechanical movement to said mass in said pressure cooler to maintain fluidity thereof, an outlet pipe connected to said pressure cooler and throughout having a substantially uniform internal cross-section dimensioned for constant flow of said mass at a relatively high velocity, and a spray nozzle attached to said outlet pipe and having a central discharge aperture of a flow cross-section substantially equal to said internal cross-section of the outlet pipe, said spray nozzle having lateral, annularly arranged apertures intersecting said central aperature at a conical angle of approximately 160° for admitting a gaseous medium under pressure and causing said medium to impinge upon said mass in a manner such that said mass will be sprayed upon said centres to be coated.

7. Apparatus as claimed in claim 6, including a conveyor for carrying said centres to be coated, means supporting said spray nozzle for movement across said conveyor, and motor means for causing said movement of the spray nozzle.

References Cited

UNITED STATES PATENTS 2,915,024   12/1959   Kruger et al.
3,229,647   1/1966    Drachenfels et al.

ROBERT W. JENKINS, Primary Examiner